(12) United States Patent
Pronkine

(10) Patent No.: US 6,865,229 B1
(45) Date of Patent: Mar. 8, 2005

(54) METHOD AND APPARATUS FOR REDUCING THE "BLOCKY PICTURE" EFFECT IN MPEG DECODED IMAGES

(75) Inventor: Viatcheslav Pronkine, Lake Hiawatha, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 625 days.

(21) Appl. No.: 09/460,930

(22) Filed: Dec. 14, 1999

(51) Int. Cl.$^7$ .................................................. H04N 7/12
(52) U.S. Cl. .................................................. 375/240.29
(58) Field of Search .............................. 348/420, 421, 348/422, 415, 446; 375/240, 240.29, 240.24, 240.26; 382/232, 260, 261, 263, 264

(56) References Cited

U.S. PATENT DOCUMENTS

| | | | | |
|---|---|---|---|---|
| 5,229,864 A | * | 7/1993 | Moronaga et al. | 358/433 |
| 5,327,366 A | * | 7/1994 | Mau | 364/724.18 |
| 5,475,501 A | * | 12/1995 | Yagasaki | 358/426 |
| 5,654,759 A | | 8/1997 | Augenbraum et al. | 348/405 |
| 5,844,614 A | | 12/1998 | Chong et al. | 348/420 |
| 5,881,180 A | | 3/1999 | Chang et al. | 382/268 |
| 6,012,024 A | * | 1/2000 | Hofmann | 704/219 |
| 6,256,394 B1 | * | 7/2001 | Deville et al. | 381/94.7 |

FOREIGN PATENT DOCUMENTS

| | | | |
|---|---|---|---|
| EP | 0577350 A2 | 1/1994 | H04N/7/13 |
| EP | 0845909 A1 | 6/1998 | H04N/7/30 |
| WO | WO9627262 | 9/1996 | H04N/1/415 |
| WO | WO9734422 | 9/1997 | H04N/7/30 |

* cited by examiner

*Primary Examiner*—Chris Kelley
*Assistant Examiner*—Behrooz Senfi

(57) ABSTRACT

A method and apparatus for applying blockiness reduction techniques to encoded video or other picture images by utilizing the run-length codes of neighboring pixel blocks to adaptively filter the decoded pixel data of interest, thereby smoothing out the gradations of intensity and color between neighboring blocks of pixels. The present invention can adaptively filter pixel data within a single picture block as well as between blocks. The method comprises the step of obtaining the run-length codes of a first encoded picture block and a neighboring picture block, deriving filter coefficients based on the run-length codes of the first encoded picture block and the neighboring encoded picture block and providing the filter coefficients, decoded first picture data and neighboring picture data to an adaptive filter, and filtering the decoded picture data of the first and neighboring picture blocks, thereby producing an outputted filtered picture signal. The apparatus comprises the necessary structure to carry out this method.

9 Claims, 4 Drawing Sheets

METHOD AND APPARATUS FOR REDUCING THE "BLOCKY PICTURE" EFFECT IN MPEG DECODED IMAGES

1. Field of the Invention

The present invention relates generally to improving the visual perception for picture data (i.e. for improved picture quality), and in particular, to an apparatus and method for reducing the "blocky picture" effect in decoded images that utilize discrete cosine transforms such as in MPEG or JPEG decoded images.

2. Description of the Prior Art

The digital transmission of picture signals is favored because of its superior quality and greater flexibility over the transmission and broadcast of: the analog signals. However, as has been recognized, digital pictures typically require a large amount of data for its representation. Compression techniques have been developed to reduce the amount of data needed to represent the picture data signal.

Various techniques of compression have been explored for the compression of such digital video or static picture signals. These methods are usually "lossy" in nature, that is, they attempt to use less data to represent the most important information present in the data, hoping that normal viewers of the decoded MPEG processed video or other picture signal will find it difficult to detect the difference between the decoded signal and the original non-coded signal. One of the popular forms of compression is to apply transform coding to the digital signal to transform the digital signal from the spatial domain to the frequency domain, the idea being to make use of the energy compaction property of the transformation, and decorrelating the image pixels so that redundancy in the image can be removed more efficiently in the transformed domain.

Discrete Cosine Transform (DCT) has been found to be a suitable transformation from an efficiency and complexity of implementation point of view. Thus, DCT has been the core technique of a few recently established International Standardization Organization (ISO) standards for the compression of images, such as JPEG, MPEG Phase-1 and MPEG Phase-2. The MPEG-2 standard that is described in the International Standards Organization—Moving Picture Experts Group, Drafts of Recommendation H.262, ISO/IEC 13818-1, and 13818-2 titled "Information Technology—Generic Coding Of Moving Pictures and Associated Audio" (hereinafter "the November 1993 ISO-MPEG Committee draft"), is hereby expressly incorporated by reference, as if fully set forth herein. References to terms herein, unless indicated otherwise, are to be interpreted in a manner that is consistent with the use of the same terms in the MPEG-2 standard.

To compress an image using the DCT method, the images are divided into square blocks of pixels (for example an 8×8 pixel block) and each of these blocks is then transformed using DCT into the transformed block (8×8) which contains the DCT coefficients. The neighboring pixel in an image is generally highly correlated, enabling DCT to transform image pixels into DCT coefficients that are energy concentrated in only a few of the coefficients around the top-left corner of the transformed block, which is the low frequency region. These transformed blocks may then be quantified into quantized coefficients and then run-length and variable length coded to further reduce the statistical redundancy present into the run-length coded data. The energy compaction property of DCT can be easily applied in block of pixels that are highly correlated.

In the case of an edge block, i.e. a block which contains parts of edges that have sharp change in intensity across the edge, the compaction of the signal energy has not been heretofore efficiently achieved. Moreover, the ability to effectively mask sharp changes in the intensity of neighboring pixels having different energy levels has not been heretofore efficiently achieved. That is, when excessive compression is applied during encoding, after quantization most of the higher order DCT coefficients become zero and the quantization steps are too large. These result in a loss of spatial, and color detail in the encoded picture.

However, it cannot be said that many attempts at overcoming the foregoing problems have not been made. One such attempt at reducing the "blockiness" in decoded video is described in U.S. Pat. No. 5,654,759 (Augenbraun et al.). However, Augenbraun et al. describe an attempt to overcome the foregoing deficiencies by focusing their attention to the preprocessing side of the video data. That is, Augenbraun et al. attempt to reduce the "blockiness" by the incorporation of instructions into the encoded video stream, such as, by using MPEG transport headers.

Such methodologies and apparatus are less than desirable for a variety of reasons, one of which requires the intrusion at the encoded data side of the transmission. That is, utilizing such configurations requires that both the encoder and decoder be more compatibly configured than is typically desired. Such a configuration would require that the decoder end of the system be specifically configured to communicate and appreciate the data being transmitted from the encoder, with the undesirable fact that the system is more sophisticated than merely the transmission of data in accordance with the MPEG standard. That: is, additional techniques must be incorporated into such a system.

Accordingly, it is desirable to provide a decoder that can conform to the requirements of the state of the art standards, such as the MPEG or JPEG standards, and requires no additional preprocessing of the encoded data, thereby minimizing, the costs that such existing additional processing adds to the system. It is also desirable to minimize the strain and additional costs needed at the decoder end of the system, while at the same time providing improved visual images. The present invention overcomes the aforementioned deficiencies and achieves the above and bellow-identified objectives.

SUMMARY OF THE INVENTION

The present invention provides for methods and apparatus for applying blockiness reduction techniques to encoded video or other picture images by utilizing the run-length codes of neighboring pixel blocks: to adaptively filter the decoded pixel data of interest, thereby smoothing out the gradations of intensity and color between neighboring pixel data where needed. The present invention can adaptively filter pixel data within a single picture block as well as between blocks, to still further improving the picture image.

Generally speaking, and in accordance with a preferred embodiment of the invention, the method of improving the visual perception of a picture comprises the steps of decoding first picture data representing a first encoded picture block and decoding neighboring picture data representing a neighboring encoded picture block, obtaining the run-length codes of each of the first encoded picture block and the neighboring encoded picture block, deriving filter coefficients based on the run-length codes of the first encoded picture block and the neighboring encoded picture block, providing the filter coefficients, the decoded first picture data and the neighboring picture data to an adaptive filter for filtering the decoded picture data of the first and neighboring picture blocks, filtering the decoded picture data of the first and neighboring picture blocks within and between them, and producing an outputted filtered picture signal propagating this algorithm on the whole picture, in both the horizontal and vertical domain.

In a preferred construction of the invention an apparatus for improving the visual perception of a picture comprises a decoder circuit for decoding picture data representing a first encoded picture block and a neighboring encoded picture data representing a neighboring decoded picture block, a coefficient deriver for receiving run-length codes associated with the first encoded picture block and the neighboring encoded picture block and for deriving a set of filter coefficient based thereon, and an adaptive filter for producing filtered picture data based on the filter coefficients and the decoded picture data from the decoder circuit.

It is an object of the invention to provide an improved apparatus and method for applying blockiness reduction techniques to encoded video or other static picture images.

It is another object of the present invention to utilize the run-length codes of a single pixel block and/or neighboring pixel blocks to adaptively filter decoded pixel data, thereby smoothing out the gradations of intensity and color to more efficiently and effectively reduce the "blocky picture" effect. That is, it is a further object of the present invention to adaptively filter pixel data within a single picture block as well as between blocks.

BRIEF DESCRIPTION OF THE DRAWINGS

These and other objects and features of the present invention will become clear from the following description taken in conjunction with the preferred embodiments thereof with reference to the accompanying drawings in which like parts are designated by like reference numerals, and in which.

DETAILED DESCRIPTION OF THE PREFERRED EMBODIMENTS

The present invention provides for methods and apparatus for reducing the blockiness in encoded picture data. The present invention permits for the improvement of the perceived image quality by applying an adaptive filtering process, utilizing the run-length codes (RLCs), to the decoded picture data.

In accordance with one embodiment of the present invention, prior to broadcasting compressed picture data, such as but not limited to MPEG video, an encoder is used to generate the encoded video data stream. Such an encoder is well known in the art, and can be for example, similar to the encoder described in the U.S. Pat. No. 5,844,614 or U.S. Pat. No. 5,654,759, the disclosures of which are incorporated by reference as if fully set forth herein. For purposes of completeness, a brief overview of a suitable encoder for use in connection with the present invention shall be disclosed.

In general, the encoding of a digital picture data signal indicating images, by compression thereof, is typically achieved with at least frame memory, a discrete cosine transformer, a quantizer, a rate controller and a coding unit.

Reference to a video signal is by way of example. The present invention is equally applicable to JPEG pictures for example. An input digital video or other picture sequence would first enter a frame memory on a frame by frame basis. In a compression system involving motion estimation and compensation techniques, the input picture frames may be classified as P-frame or I-frame. The P-frame is coded with motion estimation and compensation using previously coded frames to predict the contents of the current frame to be coded. When an input digital frame is fed into the frame memory, it is also passed to a reference frame memory for the motion estimation process. It is then passed to a block sampler for partitioning the image into spatially non-overlapping blocks of pixel data. To provide a reasonable level of adaptiveness, a block size of 8×8 pixels is preferably used.

As an I-frame, the sampled blocks are inputted to the discrete cosine transformer where discrete cosine transform is performed. The pixel data is transformed to obtain a block of DCT coefficients. The obtained DCT coefficients are then transferred to the quantizer where quantized coefficients are produced. The quantizer uses a quantizer matrix and quantizer step size given by the rate controller, which functions to ensure that a fairly constant amount of data is generated per second. The quantized coefficients 1 are then transferred to the coding unit which performs a routine of the run-length coding and variable length coding of the quantized coefficients. The result of the run-length coding & variable length coding performed by the coding unit is the output bit stream that is the picture signal bit stream to be stored or transmitted to the decoder.

Figure 1:
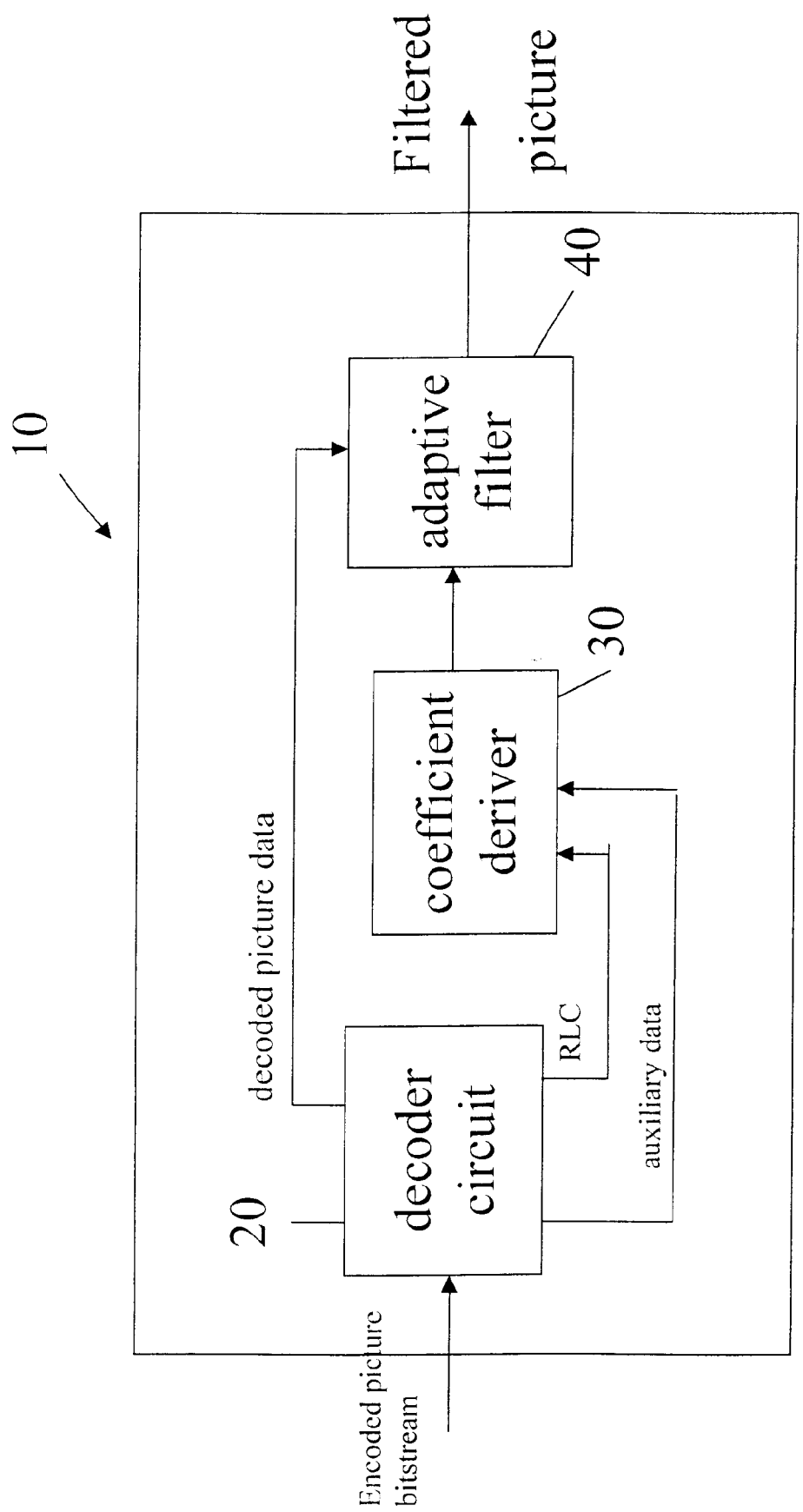
FIG. 1 is a block diagram showing an apparatus constructed in accordance with the present invention.

Reference is now made to FIG. 1, which illustrates a picture decoder, generally indicated at 10 constructed in accordance with a preferred embodiment of the present invention. Decoder 10 preferably includes a picture decoder circuit 20 which receives as an input the encoded picture signal. One output (labeled RLC) of decoder circuit 20 is coupled to an input of a coefficient deriver 30, the function of which is described in greater detail below. A second output, such as that transmitting the digital picture output from decoder circuit 20, is coupled to the input of an adaptive filter 40 such as an FIR filer constructed in accordance with the present invention. The output of coefficient deriver 30 is coupled to a second input of adaptive filter 40. As will be understood below, the output of filter 40 is the picture data that has been filtered in accordance with the present invention, and is a function of the RLCs of neighboring pixel block data and the decoded pixel data before such filtering.

The construction of a suitable picture decoder circuit, such as that used for picture decoder circuit 20, should be understood by one of ordinary skill in the art. However, for completeness, a general description of an acceptable picture decoder circuit will be now be described, the material aspects of the decoder being described in U.S. Pat. No. 5,8441,614 and acceptable to carry out the present invention.

Generally speaking, picture decoder circuit 20 preferably includes at least a decoding unit, an inverse quantizer, an inverse discrete cosine transformer, a decoded frame memory and a local decoded frame memory, and may be coupled to the aforementioned encoder. The received bit stream, being the compressed picture signal, also has coded information. The decoder circuit applies the encoded picture signal with a variable length & run-length decoding operation. Then, the decoding unit demultiplexes and decodes the variable length codes to produce the quantized coefficients of each block of the coded frame. The decoder circuit preferably also checks the attribute of the frame to be decoded to see whether the frame, for example, is an I-frame or a P-frame. The inverse quantizer may be connected to the decoding unit for receiving the decoded quantized coefficient block and to apply an inverse quantization process. The inverse DCT (inverse Discrete Cosine Transformer) is connected to the inverse quantizer for receiving the inverse quantized coefficient block and to apply an inverse discrete cosine transformation process thereto. Thus, the inverse DCT produces the inverse DCT coefficient block that is a sequence of blocks of decoded pixel data.

It should now be appreciated that picture decoder circuit 20 has stored therein and can respectively output to coefficient deriver 30 and adaptive filter 40 the aforementioned decoded pixel data and the RLCs, typically generated in the encoder.

Coefficient deriver 30 receives the RLCs from decoder circuit 20. Coefficient deriver 30 then derives the filter coefficients for filter 40 based on a number of methodologies, all well within the scope of one skilled in the art. For example, the filter coefficients may be derived based on an algorithm stored in deriver 30. Alternatively, the filter coefficients may be calculated by using weighting factors. Still further, the filter coefficients may be stored in a look-up table (LUT) or linked list, all common storage methods used in standard programming, and obtained using the RLCs as a "pointer".

In one preferred embodiment the RLCs related to the neighboring blocks of pixels from the decoded frame are inputted to coefficient deriver 30, where the set of filter coefficients may be selected to low pass filter the image elements having a cut-off frequency with frequency content of adjacent pixel blocks. These filter coefficients are then inputted to the adaptive filter 40 where the decoded pixel data is filtered to effectively smooth out the sharp edges of intensity appearing between blocks of pixels of varying intensity or color. The resulting filtered picture, is then outputted in a known manner.

In yet another manner, it should be understood that dropping higher order coefficients is equivalent to reducing the sampling frequency in the encoder. That is, it should be appreciated that, if, according to NYQUIST, the sampling frequency must be at least twice the bandwidth of the low-pass filter to get a smooth restored analog signal, the current equivalent frequency can be used to construct a filter and the appropriate filter coefficients can be derived by deriver 30.

Figure 2:
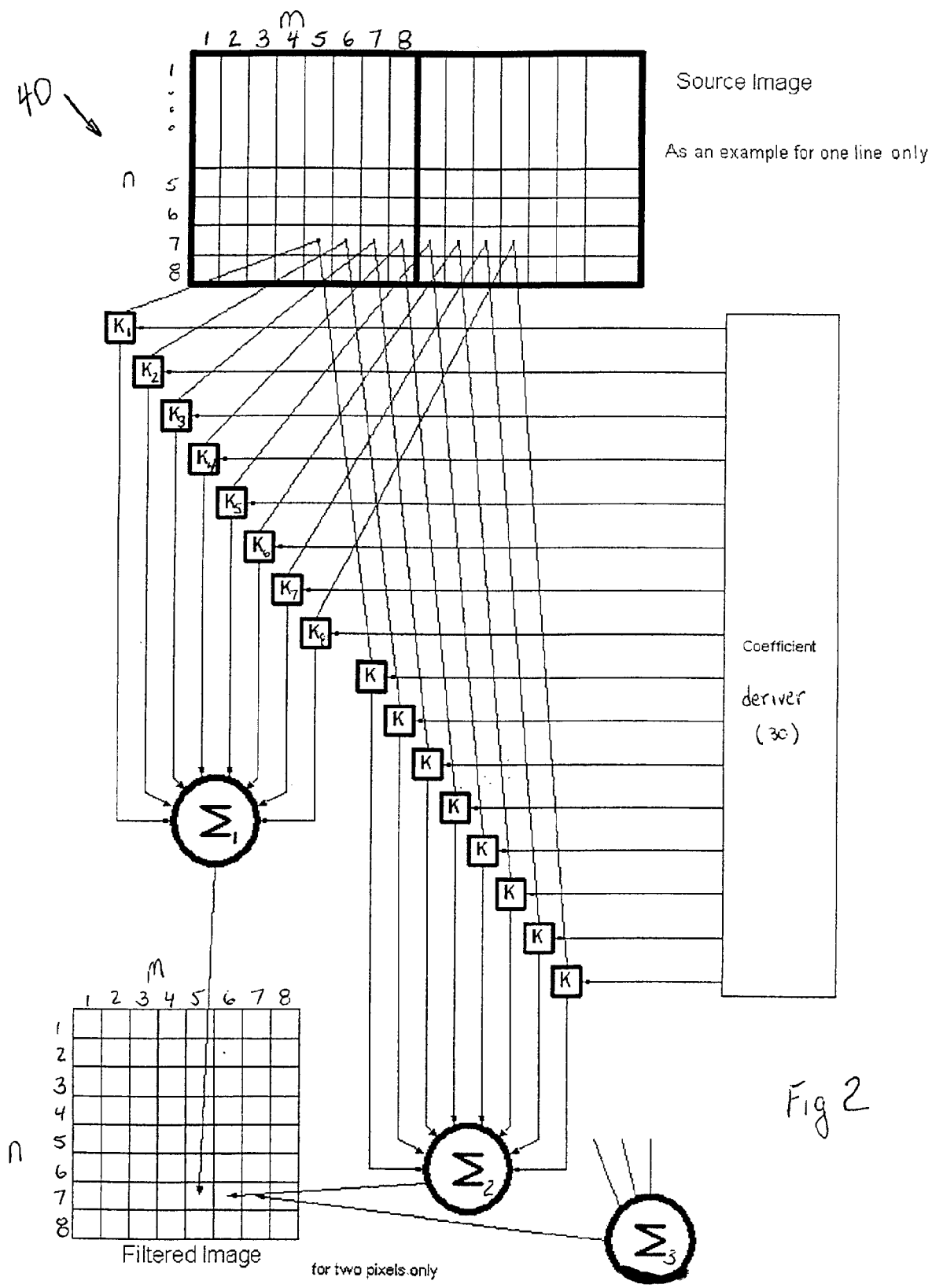
FIG. 2 illustrates the construction of an adaptive filter constructed in accordance with a preferred embodiment of the present invention.

Reference is now made to FIG. 2 which depicts in greater detail, the construction of the preferred filter 40 (with coefficient deriver 30 also being illustrated for convenience). In the illustrated example, the default n×m sized group of pixels (from the source (i.e. decoded) image) is 8×8, and the "smoothing" operation is to be carried out over the edge of two picture blocks. That is, the "smoothing" operation being carried out in FIG. 2 is over the last four pixels in the horizontal domain of a first pixel block and the first four pixels in the horizontal domain in a neighboring block. Each pixel value from the first block (i.e. with coordinates 7,5; 7,6; 7,7; 7,8) and each pixel value from the neighboring block (i.e. with coordinates 7,1; 7,2; 7,3; 7,4) are correspondingly and respectively multiplied by a filter coefficient ($K_1$–$K_8$) associated therewith. In this way, each unfiltered pixel data value may be adjusted based on the neighboring pixel values by having each of the adjusted decoded pixel data values inputted to a corresponding summator ($E_1$, $E_2$, ... $E_8$). The corresponding summator outputs a filtered pixel data value for a corresponding filtered block pixel, each filtered picture data value being a function of all the aforementioned pixel data values (from the source image) having been adjusted based on the corresponding coefficients ($K_1$–$K_8$), and after the corresponding operation thereon within the respective summator. Each filtered pixel data value for the first filtered pixel block (shown in FIG. 2) and the neighboring filtered pixel block (not shown) can be calculated in this manner. The picture image, if unacceptable color or intensity variations existed in the unfiltered decoded picture data, will be smoothed out, making for a much more pleasurable image for the viewer to see.

Figure 3:
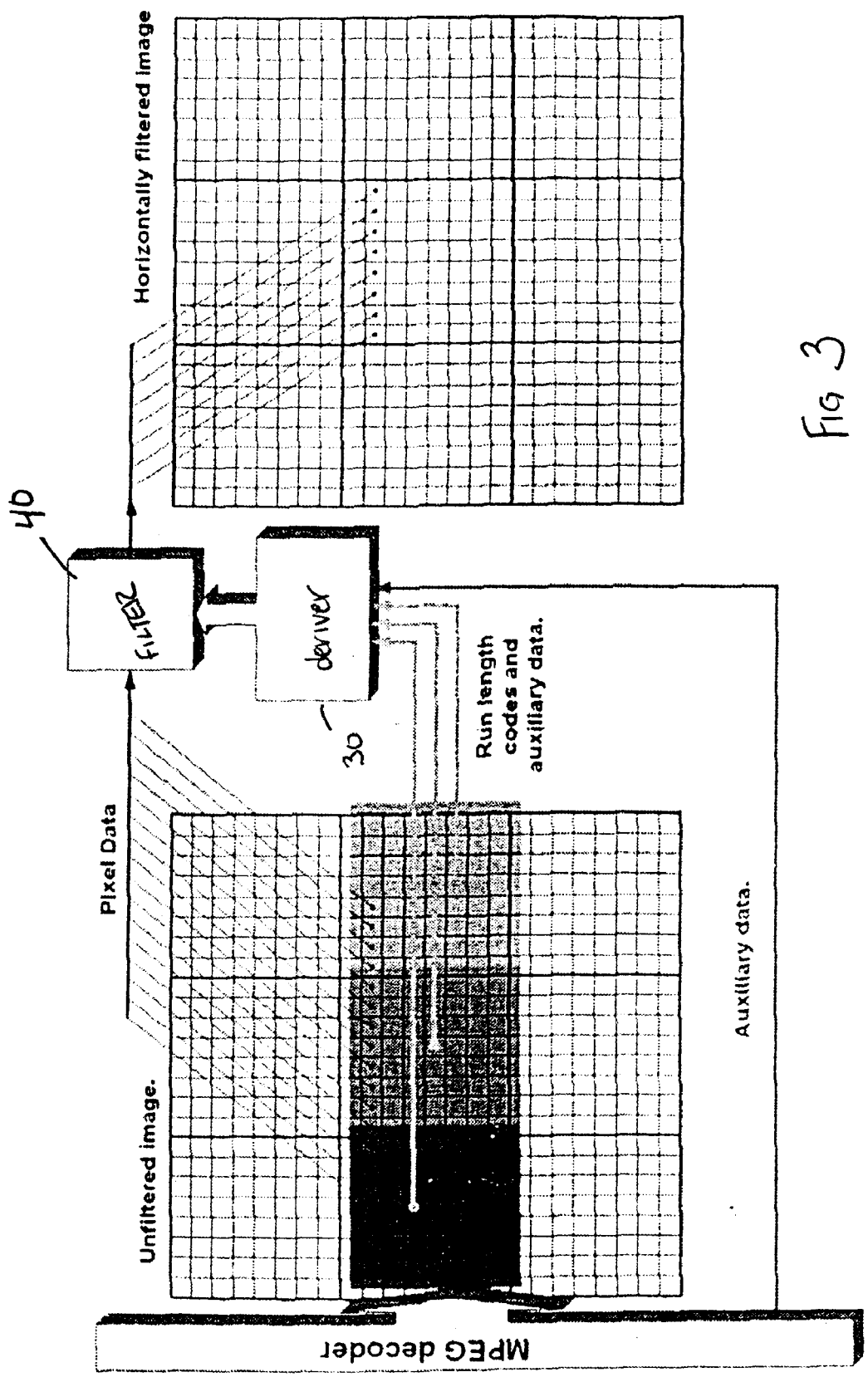
FIG. 3 illustrates an example of the filtering process carried out by the present invention on a set of unfiltered pixel data.

FIG. 3 more generally illustrates the foregoing process. In particular, FIG. 3 is a simplified illustration of the unfiltered pixel data being inputted to the adaptive filter 40. FIG. 3 also illustrates the RLCs being inputted to the coefficient deriver 30. The output of the adaptive filter 40 includes adjusted (if appropriate, as explained below) pixel data, which represents the filtered image seen by the viewer.

The foregoing example should not be interpreted in a limiting sense. The present invention is adaptable to a number of different configurations. For example, the present invention can smooth out the decoded image on an inter-block or intrablock. Filter 40 can adjust the pixel values within a block, or on the edge of two neighboring blocks. The example above illustrates, in the horizontal domain, the filtering of the last four pixel values of a first pixel block and the first four pixel values of a neighboring block. Alternatively, the pixel data from all eight pixel values in one horizontal line of a single pixel block may be filtered. FIG. 2 could be modified to illustrate this example by shifting the corresponding reference lines of the source image pixel coordinates of the two pixel blocks(i.e. 7,5; 7,6; 7,7; 7,8; 7,1; 7,2; 7,3; 7,4) four coordinates to the right or left (i.e. 7,1; 7,2; 7,3; 7,4; 7,5; 7,6; 7,7; 7,8). In this way, the color/intensity can be smoothed out within one particular block.

It is also contemplated that there be a combination of the foregoing, whereby the picture image can be smoothed out both within intrablocks and interblocks. Also, 8×8 is but one example of a suitable n×m pixel block. Both smaller and larger blocks are possible, and the filter would be altered or modified accordingly.

Still further, in the present example, each filtered pixel data is dependent on the other pixel data values within the filter at a particular point in time. It is also contemplated having each filtered pixel value dynamically changing as new unfiltered pixel values are inputted to filter 40. This feature could in part be determined by the method of outputting the filtered data, that is, whether it is outputted serially or in parallel.

The present invention utilizes the information contained in the RLCs. The RLCs could be sent to the deriver 30 in a plurality of ways all within the scope of the invention. Based thereon, outputted to filter 40 is the predetermined set of filter coefficients and each of the decoded pixel values may be respectively multiplied by one of the corresponding predetermined filtered coefficients. The result is inputted to the summator(s) wherein an adjusted pixel value is outputted for each previously decoded pixel value.

As would be well appreciated by one skilled in the art, the present invention works equally well in the horizontal and vertical domain, the filtering of which may be sequentially or simultaneously, depending on the construction implementation of the picture system or filter.

It should be appreciated that the present invention can dynamically filter both picture data with a high number of harmonics (thereby representing picture data with a high degree of detail) and with a low number of harmonics (representing picture data with a low degree of detail). That is, careful selection, derivation algorithms or "linked list" data can allow for the pixel data to not be filtered by filter 40. If appropriate, such as in an example wherein the DCT coefficients after inverse quantization are all nonzero, i.e. there exists important high order harmonics in the decoded pixel data, filter 40 will not adjust the decoded pixel data, and all the detail in the pixel block will be outputted by filter 40. In such a case one coefficient for each filter may be equal to one (1) thereby not changing the corresponding pixel value.

Figure 4:
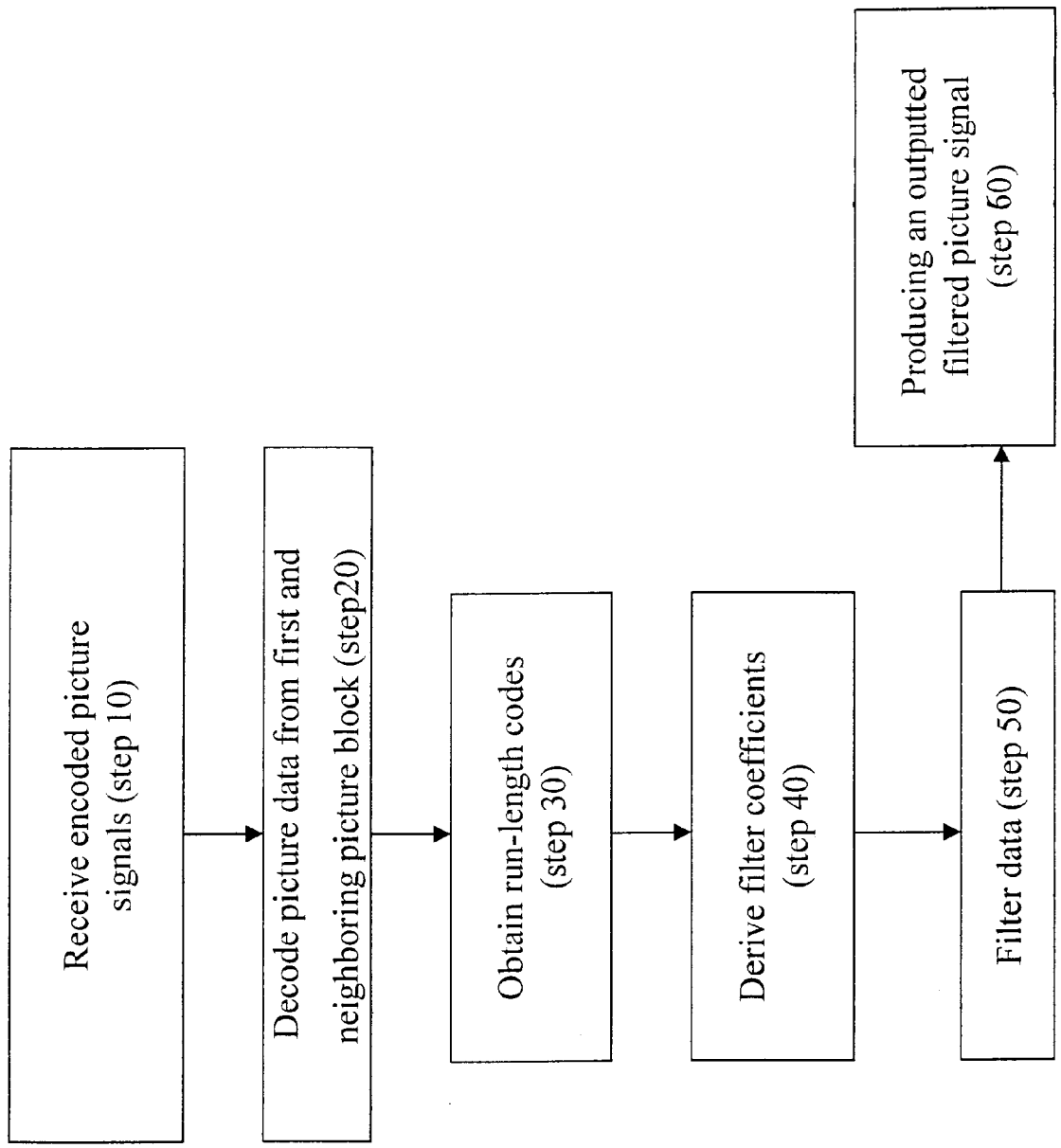
FIG. 4 is a flow chart showing/the methodology of reducing the "blocky picture" effect in accordance with the present invention.

Reference is next made to FIG. 4, for a description of the preferred method of improving the visual perception of a picture, wherein the picture is derived from a decoded picture signal comprised of blocks of quantized coefficient data produced by encoding an input picture signal.

In particular, the methodology to carry out the present invention comprises the steps of, after receiving the encoded picture signal from the encoder (step 10), decoding the received picture data representing a first picture block being of an n×m sized group of pixels and decoding neighboring picture data representing a neighboring picture block being of an n×m sized group of pixels (step 20) (where n and m are each preferably 8, by way of example and not limitation), obtaining the run-length codes of each of the first picture block and the neighboring picture block (step 30) and deriving filter coefficients based on the run-length codes of each of the first picture block and the neighboring picture block (step 40). Reference to the term "deriving" should not be understood in its limiting sense. That is the "deriving" of the coefficients for use in filter 40 can also be "calculated" using known algorithm methodology or the methods outlined above. Therefore, reference to deriving should encompass all such methods to obtain such coefficients.

The method further includes the steps of providing such filter coefficients and the decoded picture data to an adaptive filter (step 50), such as an FIR filter, wherein the adaptive filter may be comprised of a variable attenuator and a plurality of summing circuits as illustrated in FIG. 2. Outputted from the adaptive filter is the outputted filtered picture signal (step 60) having the characteristic that it is more pleasant for viewing (psycho visual system). The sequence set forth in FIG. 4 is by example. For instance, the RLCs can be obtain before or simultaneously with the decoding step. Certain steps may be performed in a different sequence while remaining within the scope of the invention.

Lastly, it should be understood that the invention can still be further refined by the utilization of the auxiliary data comprised of other MPEG or other compression data to still further aid in selection of the coefficients for filter 40. In such a construction, outputted from the decoder circuit 210 to deriver 30 would be such additional auxiliary data as illustrated in FIG. 1. Still further, although references are made to first blocks and neighboring blocks, such references are by way of example. That is, picture data must be filtered for a first block and all neighboring blocks (in case filtering is done sequentially, first horizontally, there will be two neighboring blocks: previous and following in horizontal after which are two in vertical: above, and below), for the whole picture, in horizontal and vertical domain.

While the invention has been particularly shown and described with respect to preferred embodiments thereof, it will be understood by those skilled in the art that changes in form and details may be made therein without departing from the scope and spirit of the invention.

What I claim is:

1. A method of improving the visual perception of a picture, the picture being derived from a decoded picture signal comprised of blocks of quantized coefficient data produced by encoding an input picture signal, the method comprising:

decoding first picture data representing a first encoded picture block being of an n×m sized group of pixels and decoding neighboring picture data representing a neighboring encoded picture block being of an n×m sized group of pixels;

obtaining the run-length codes of each of the first encoded picture block and the neighboring encoded picture block;

deriving filter coefficients based on the run-length codes of each of the first encoded picture block and the neighboring encoded picture block;

providing the filter coefficients, the decoded first picture data and the neighboring picture data to an adaptive filter for filtering the decoded picture data of the first and neighboring picture blocks;

filtering the decoded picture data of the first and neighboring picture blocks; and producing an outputted filtered picture signal.

2. The method as claimed in claim 1, including the step of selecting n equal to 8 and selecting m equal to 8.

3. The method as claimed in claim 1, including the step of producing filtered pixel data values for a first filtered pixel block of an n×m sized group of pixels and for a neighboring filtered pixel block of an n×m sized group of pixels, the pixel data values of the first and neighboring filtered pixel block being a function of the decoded picture data of the first and neighboring picture blocks.

4. The method as claimed in claim 1, wherein one filter coefficient is equal to one, and wherein at least one filtered pixel value from the filtered pixel block is equal to its corresponding decoded pixel value from one of the first decoded pixel block and the neighboring pixel block.

5. An apparatus for improving the visual perception of a picture, the picture being derived from a decoded picture signal comprised of blocks of quantized coefficient data produced by encoding an input picture signal, the apparatus comprising:

a decoder circuit for decoding picture data representing a first encoded picture block being of an n×m sized group of pixels and for decoding neighboring encoded picture data representing a neighboring decoded picture block being of an n×m sized group of pixels;

a coefficient deriver, coupled to the decoder circuit, for receiving run-length codes associated with the first encoded picture block and the neighboring encoded picture block and for deriving a set of filter coefficients based thereon;

an adaptive filter, coupled to the decoder circuit and the coefficient deriver, for producing filtered picture data based on the filter coefficients and the decoded picture data from the decoder circuit.

6. The apparatus as claimed in claim 5, including means for outputting a filtered picture signal.

7. The apparatus as claimed in claim 5, wherein n is selected to equal 8 and m is selected to equal 8.

8. The apparatus as claimed in claim 5, wherein n is selected to be an integer other than 8 and m is selected to be an integer other than 8.

9. The apparatus as claimed in claim 5, wherein the adaptive filter comprises a plurality of summators, and wherein the filtered picture data for a first filtered pixel block is a function of the run-length codes and decoded picture data of the first and neighboring picture blocks.

* * * * *